United States Patent
Ho et al.

(10) Patent No.: US 7,403,531 B2
(45) Date of Patent: Jul. 22, 2008

(54) WLAN ADMISSION CONTROL FOR MULTIMEDIA SERVICE

(75) Inventors: Jin-Meng Ho, Plano, TX (US); Donald P. Shaver, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1047 days.

(21) Appl. No.: 10/449,796

(22) Filed: May 30, 2003

(65) Prior Publication Data

US 2004/0240463 A1  Dec. 2, 2004

(51) Int. Cl.
*H04L 12/56* (2006.01)

(52) U.S. Cl. ............... 370/395.4; 370/395.41; 370/395.43; 370/310; 370/235

(58) Field of Classification Search ......... 370/431–546, 370/235, 310, 395.4, 395.41, 395.43
See application file for complete search history.

(56) References Cited

U.S. PATENT DOCUMENTS

| | | | | |
|---|---|---|---|---|
| 5,982,748 A | * | 11/1999 | Yin et al. | 370/232 |
| 6,011,784 A | * | 1/2000 | Brown et al. | 370/329 |
| 6,049,549 A | * | 4/2000 | Ganz et al. | 370/449 |
| 6,389,547 B1 | * | 5/2002 | James et al. | 713/400 |
| 6,754,210 B1 | * | 6/2004 | Ofek | 370/389 |
| 6,865,609 B1 | * | 3/2005 | Gubbi et al. | 709/230 |
| 7,039,068 B1 | * | 5/2006 | Halasz | 370/473 |
| 7,158,532 B2 | * | 1/2007 | Garney et al. | 370/447 |
| 2002/0071413 A1 | | 6/2002 | Choi | |
| 2002/0085582 A1 | | 7/2002 | Kim | |
| 2002/0105930 A1 | * | 8/2002 | Sydon et al. | 370/337 |
| 2003/0031129 A1 | * | 2/2003 | Dutkiewicz | 370/230 |
| 2003/0078063 A1 | * | 4/2003 | Legallais et al. | 455/509 |
| 2003/0152059 A1 | * | 8/2003 | Odman | 370/338 |
| 2003/0204660 A1 | * | 10/2003 | Saito et al. | 710/305 |
| 2004/0196850 A1 | * | 10/2004 | Ho | 370/395.4 |
| 2004/0204080 A1 | * | 10/2004 | Hayduk | 455/557 |

OTHER PUBLICATIONS

Takazawa et al, VBR Video Transmission With Isochronous and Asynchronous Transfer Mode Over Wireless 1394, Oct. 27-30, 2002, vol. 3, pp. 1088-1092.*

* cited by examiner

*Primary Examiner*—Hassan Kizou
*Assistant Examiner*—Mounir Moutaouakil
(74) *Attorney, Agent, or Firm*—Steven A. Shaw; W. James Brady; Frederick J. Telecky, Jr.

(57) ABSTRACT

The present invention provides a system for controlling isochronous data admission, within a WLAN system (102) that transports both isochronous and asynchronous data. The system includes an apparatus (300), functioning as an access point within a WLAN system. The apparatus comprises a memory (306) and a transceiver (312) communicatively coupled to the memory. The apparatus further comprises an access coordinator (302), communicatively coupled to the memory, and adapted to: evaluate actual access times of previous isochronous data streams, to determine projected access times needed by a new isochronous data stream, and to decide to admit or reject the new isochronous data stream based on an evaluation of the actual and projected access times.

31 Claims, 2 Drawing Sheets

WLAN ADMISSION CONTROL FOR MULTIMEDIA SERVICE

TECHNICAL FIELD OF THE INVENTION

The present invention relates generally to controlling wireless local area network (WLAN) access for multimedia traffic and, more particularly, to a system for determining whether a new data stream is scheduled access time for transmission, based on evaluation of specified criteria.

BACKGROUND OF THE INVENTION

Increasing demands for data communications have resulted in the development of techniques that provide more cost-effective and efficient means of using communication networks to handle more information, and new types of information. One common technique is to segment the information, which may be a voice or data communication, into packets. A packet is typically a group of binary digits, including both data and control information. Networks, especially multimedia networks, generally carry multiple classes of packet traffic—including voice, image and other framed data. Most networks comprise devices that may source, sink or forward packet-based data. Routing of data is often limited by the processing capacity and physical throughput properties of various functional units and media within the communications network. Such constraints can cause congestion and Quality of Service ("QoS") problems within the system.

A wireless local area network (WLAN) provides an Ethernet-like channel that uses wireless media (e.g., radio frequency transceivers), instead of wires or cables, to enable data communications between or amongst computers, and other types of electronic devices, on the network. While providing mobility and portability, WLANs avoid the effort and costs involved in running and maintaining cables. WLANs are thus becoming increasingly popular as a communication and networking platform. A WLAN typically has a number of stations and an access point (AP). An AP operates to attach or connect respective stations wirelessly to an external network, and to one another. A WLAN generally has several protocol layers—among which are a physical (PHY) layer, and a medium access control (MAC) sub-layer.

A MAC, usually comprising both hardware and software, is typically located at the AP and at each station—controlling access to the wireless medium (e.g., radio frequency transceivers). Transmission from an AP to a station is referred to as downlink. Transmission from a station to an AP is referred to as an uplink. Finally, transmission between stations is referred to as sidelink.

Often, all transmissions within a WLAN must share a single frequency channel or communication medium. Thus, conflicts or collisions of data packets or frames are likely to occur whenever different traffic streams and bursts simultaneously arrive at a given transmission point, and need to access the shared medium for transport to other transmission points. Accordingly, several approaches have been developed to manage access between competing traffic streams and bursts, and to ensure that allowing access will not cause excessive collisions over the medium.

For example, in one conventional approach, known as Distributed Coordinator Function (DCF), a station must sense the medium before a new data frame is sent from that station. If the medium is found to be idle for at least a DCF Inter Frame Space (DIFS) period of time, the frame is transmitted. Otherwise, a back-off time B—measured in a number of time slots—is chosen randomly from within the interval [0-CW), where CW is the contention window. After the medium has been detected as being idle for at least a DIFS, the back-off timer is decremented for each time slot the medium remains idle. When the back-off timer reaches 0, the frame is transmitted. Upon detection of a collision, a new back-off time is chosen, using a CW of double the previous one, and the back-off procedure starts over. Other conventional mediation schemes for determining access include: an enhancement of DCF, referred to as EDCF; Distributed Fair Scheduling; and Blackburst.

In some conventional WLAN access management procedures, isochronous data streams are provided access time during a succession of time or service periods. When a given station has a new data stream, it sends a stream access request to an access coordinator, located at the AP, together with QoS requirements or parameters for the new data stream. When a coordinator decides to admit a new isochronous data stream to schedule access time, provision must be made to ensure that QoS requirements for previously admitted isochronous streams will still be met.

Thus, conventional systems often employ some sort of worst-case or maximum timing scheme to ensure QoS standards are met. For example, consider a system in which the longest possible arrival of an isochronous stream to be transmitted requires an access time on the order of 10 milliseconds. In a conventional system where each successive service period is on the order of 20 milliseconds, only two streams are admitted for access. This is done to ensure that all admitted streams have sufficient access time. On average, however, some of the admitted streams actually have shorter arrival times, while others actually have longer arrivals in a given service period. Thus, much more than two streams could be admitted and given access times. As a result, a great deal of access time for transporting data across the WLAN is unused, and thus wasted, when admission control is based on the maximum temporal needs of individual streams.

As a result, there is a need for a system for controlling WLAN admission access that was readily adaptable to isochronous streams of widely varying interval and arrival times, overcoming the inefficiencies of conventional access systems. Moreover, it would be desirable to provide such a system for controlling WLAN admission access without degrading or diminishing QoS for respective admitted isochronous streams and asynchronous bursts.

SUMMARY OF THE INVENTION

The present invention provides a versatile system for controlling WLAN admission access that is readily adaptable to isochronous streams of widely varying interval and arrival times, in an efficient and effective manner. The present invention further provides WLAN admission control without degrading or diminishing QoS for respective admitted isochronous streams and asynchronous bursts.

More specifically, the present invention provides a system for determining whether a particular isochronous stream, originating from one of the stations in a WLAN, should be allowed or admitted to schedule access time for transmission. The present invention provides a WLAN control system wherein access admission decisions are based on recent actual use of access times, and also on anticipated effects of admitting the particular isochronous stream. The system of the present invention enables successive isochronous steams, of widely varying data rates, to be selectively admitted for scheduling access times, during a succession of service periods. Thus, available access times can be used with optimal efficiency, so that waste of data transport capacity within the WLAN is substantially reduced. Moreover, the system of the present invention ensures that admission of a particular isochronous stream will maintain the QoS requirements for previously admitted streams.

The present invention provides a method for controlling admission of a new isochronous data stream, within a WLAN system that transports both isochronous and asynchronous data. The method comprises evaluating actual access times of previously admitted isochronous data streams. The method also comprises determining projected access times needed by the new isochronous data stream. Then a decision to admit or reject the new isochronous data stream, based on an evaluation of the actual and projected access times, is made.

One specific embodiment of the present invention provides a method for controlling admission of a new isochronous data stream, within a WLAN system that schedules successive isochronous data streams for transport during successive service periods, each service period comprising a primary and an extended access portion. Actual access times of previously admitted isochronous data streams are evaluated by providing a first threshold number, determining a first value equal to the length of an individual previous service period, calculating a second value equal to an average of actual total access times used for isochronous streams during each of the first threshold number of previous service periods. The method further comprises determining projected access times needed by the new isochronous data stream by calculating a third value equal to, if and when the new isochronous data stream is admitted, the length of a new service period, and calculating a fourth value equal to, if and when the new isochronous data stream is admitted, a total primary access portion of the new service period. Then a decision to admit or reject the new isochronous data stream, based on an evaluation of the actual and projected access times, is made. This decision process comprises calculating a fifth value equal to the second value divided by the first value, determining a sixth value equal to a total primary access portion of an individual previous service period, calculating a seventh value equal to the sixth value divided by the first value, and calculating an eighth value equal to the fourth value divided by the third value, providing a second threshold value, and comparing the eighth value with the second threshold value. If the eighth value is greater than the second threshold value, then the new isochronous data stream is rejected. Otherwise, the decision process provides a third threshold value, calculates a ninth value equal to the sum of the fifth and eighth values, less the seventh value, and compares the ninth value with the third threshold value. If the ninth value is greater than the third threshold value, the new isochronous data stream is rejected. Otherwise, the new isochronous data stream is admitted for scheduling.

The present invention also provides a system for controlling isochronous data admission, within a WLAN system that transports both isochronous and asynchronous data. The system comprises a processor and a computer readable medium communicatively coupled to the processor. The computer readable medium comprises processor instructions directing the processor to evaluate actual access times of previously admitted isochronous data streams, to determine projected access times needed by a new isochronous data stream, and to decide to admit or reject the new isochronous data stream based on an evaluation of the actual and projected access times.

The present invention further comprises an apparatus that functions as an access point within a WLAN system that transports both isochronous and asynchronous data. The access point apparatus comprises a memory with a transceiver communicatively coupled thereto. The apparatus further comprises an access coordinator, communicatively coupled to the memory. The access coordinator is adapted to evaluate actual access times of previous isochronous data streams, to determine projected access times needed by a new isochronous data stream, and to decide to admit or reject the new isochronous data stream based on an evaluation of the actual and projected access times.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The invention will now be described in conjunction with a representative example of managing isochronous data in a particular WLAN configuration. The specific embodiments discussed herein are merely illustrative of specific ways to make and use the invention and do not limit the scope of the invention.

The present invention defines a system for controlling WLAN admission access. That system is readily adaptable to isochronous streams of widely varying interval and arrival times. The system of the present invention provides WLAN admission control in an efficient and effective manner. The present invention further provides WLAN admission control without degrading or diminishing QoS for respective admitted isochronous streams and asynchronous bursts.

More specifically, the system of the present invention determines whether a particular isochronous stream, originating from one of the stations in a WLAN, should be allowed or admitted to schedule access time for transmission. Recognizing that a dynamic evaluation system is desirable, the control system of the present invention provides WLAN access admission decisions based on recent actual use of access times, and also on anticipated or projected effects of admitting a given isochronous stream. Recognizing that the time and duration of isochronous data streams vary, the system of the present invention enables successive isochronous steams, of widely varying data rates, to be selectively admitted for scheduling access times, during a succession of service periods. With the present invention, available access times can be used with optimal efficiency, so that waste of data transport capacity within the WLAN is substantially reduced. Moreover, the system of the present invention ensures that admission of a particular isochronous stream will maintain the QoS requirements for previously admitted streams.

Figure 1:
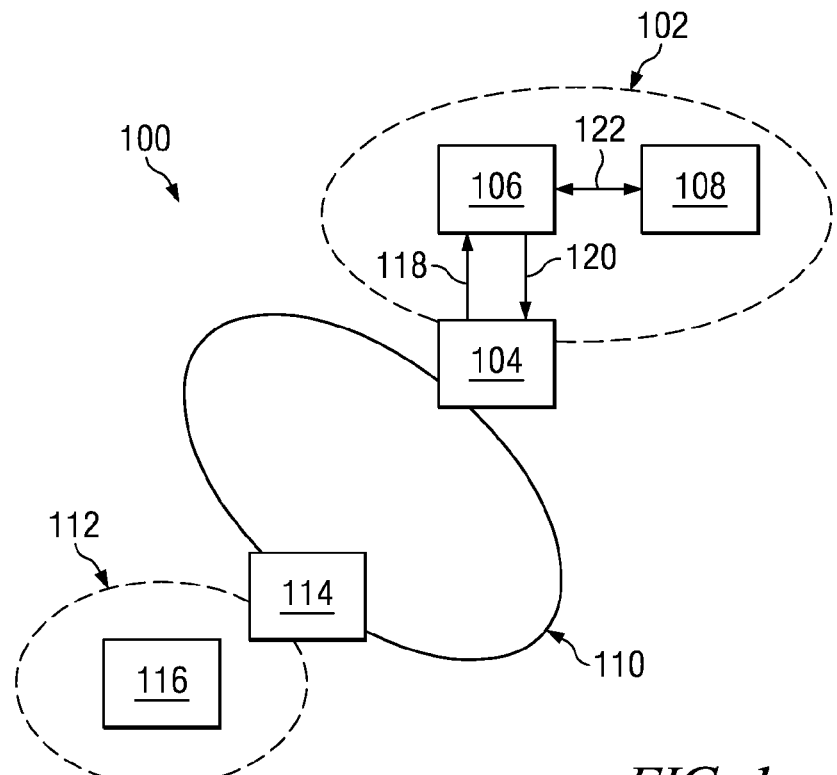
FIG. 1 is an illustration of one embodiment of a WLAN system according to the present invention.

Referring now to FIG. 1, a communication system 100 according to one representative embodiment of the present invention is illustrated. System 100 comprises a WLAN 102. For purposes of explanation and illustration, WLAN 102 is depicted comprising an AP 104, and stations 106 and 108. Typically, however, a WLAN includes more than two stations. AP 104 connects to a distributed communications system 110. Accordingly, a communication path can be established from AP 104 to a second WLAN 112 through its AP 114, which is also connected to distributed communications system 110. Stations 106 and 108 of WLAN 102 are thereby able to communicate with a station 116 within WLAN 112.

A downlink transmission 118 in WLAN 102 is directed from the AP 104 to a station, an uplink transmission 120 is directed from a station to the AP 104, and a sidelink transmission 122 is transmitted from one station to another. WLAN 102 is also provided with a MAC sub-layer 200, described hereinafter in further detail in reference to FIG. 2. A system for determining whether to admit data traffic (i.e., an isochronous stream) for scheduling access time in WLAN 102 is provided as described hereinafter. Such a system readily accommodates a succession of isochronous stream arrivals of continually varying data rates and other characteristics. This system also ensures full compliance with QoS requirements for successive admitted isochronous streams.

The process of managing access for data traffic in a WLAN may be categorized into several tasks or components, referred to respectively as: 1) access management; 2) access control; and 3) data manipulation and transfer. Access management involves determining which source of data traffic is entitled, or has the right, to transmit at any given time. This feature, also referred to as admission, is provided in various embodiments of the present invention.

Access control determines when to transmit specific data. Thus, this task involves scheduling access time to a WLAN for admitted data traffic or streams, and also tracking access time actually used. Data manipulation and transfer involves transferring data along a transmit and receive (TX/RX) path from or to external memory.

Figure 2:
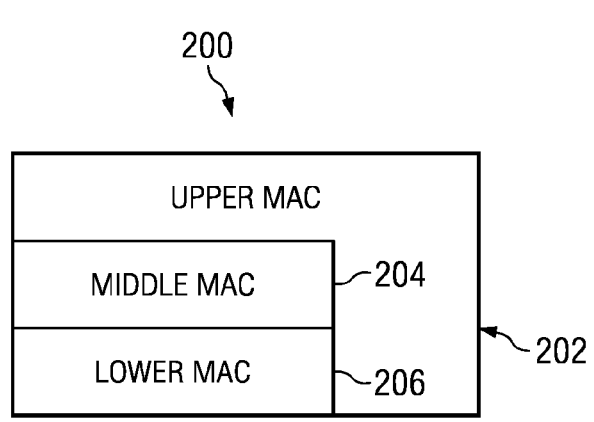
FIG. 2 is an illustration depicting components of a MAC according to one embodiment of the present invention.

Referring now to FIG. 2, the MAC 200 for WLAN 102 is illustrated. MAC 200 is instantiated within AP 104. MAC 200 is partitioned or layered corresponding respectively to the three management tasks described above. Thus, an upper layer 202 of MAC 200 is provided, directed and corresponding to access management. Upper layer 202 is provided with software and firmware for determining and monitoring which station has the right to transmit data at a given time. Upper layer 202 also manages and configures firmware, hardware and data buffers. Layer 202 is tolerant to delays on the order of milliseconds, so that it may accommodate delays within the QoS parameters of certain types of data traffic. Furthermore, layer 202 is associated with a processor adapted to operate on quantities with latencies in the range of milliseconds, as described hereinafter.

MAC 200 further comprises a middle MAC layer 204, provided with firmware directed and corresponding to access control. MAC layer 204 determines when and what local data to transmit, schedules access times for all traffic in the WLAN, and tracks the actual transmission of data and access time use. MAC layer 204 is also responsible for forming and parsing data frames for transmission. Access times scheduled by layer 204 have latencies on the order of microseconds, thus real-time scheduling is very critical. Accordingly, layer 204 is associated with a processor adapted to operate on quantities with latencies in the range of microseconds, as described hereinafter.

MAC 200 further comprises a lower MAC layer 206, provided with hardware directed and corresponding to data manipulation and data transfer. Layer 206 calculates and validates frame check sequences, encrypts and decrypts data payloads, and transfers data along the TX/RX path from or to external memory.

Figure 3:
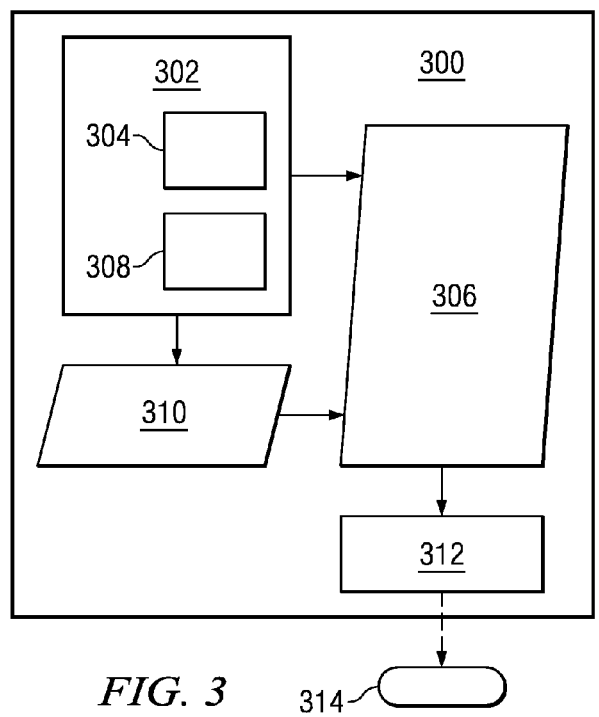
FIG. 3 is an illustration depicting an access point according to one embodiment of the present invention.

Turning now to FIG. 3, an AP 300 according to one embodiment of the present invention is illustrated. AP 300 may correspond to AP 104 or 114 of FIG. 1. AP 300 is provided with an access coordinator 302. Access coordinator 302 is a unit within WLAN 102 that addresses functionalities associated with upper MAC level 202 and middle MAC level 204. Accordingly, access coordinator 302 has a processor 304 that is operable on quantities with latencies in the range of milliseconds and is associated with the MAC layer 202. Processor 304 cooperatively interacts with a MAC memory 306, in accordance with the present invention as described hereinafter, to determine whether a particular isochronous stream will be admitted in order to schedule access time within WLAN 102.

AP 300 further comprises a processor 308 and a host memory 310. Processor 308 is associated with MAC layer 204. In one embodiment of a downlink transfer, processor 308 transfers the next data frame scheduled for access from memory 310 to MAC memory 306, at a time interval ($T_D$) before the expected starting time of that data frame. For uplink and sidelink transfers in WLAN 102, processor 308 prepares a poll frame in memory 306, at a time interval ($T_P$) before the expected starting time of such poll frame. If data is to be sent along with the poll frame, the transfer procedure described above in connection with downlink transfer is followed. Frames are transmitted from memory 306 by a transceiver 312 into a wireless medium 314.

Figure 4:
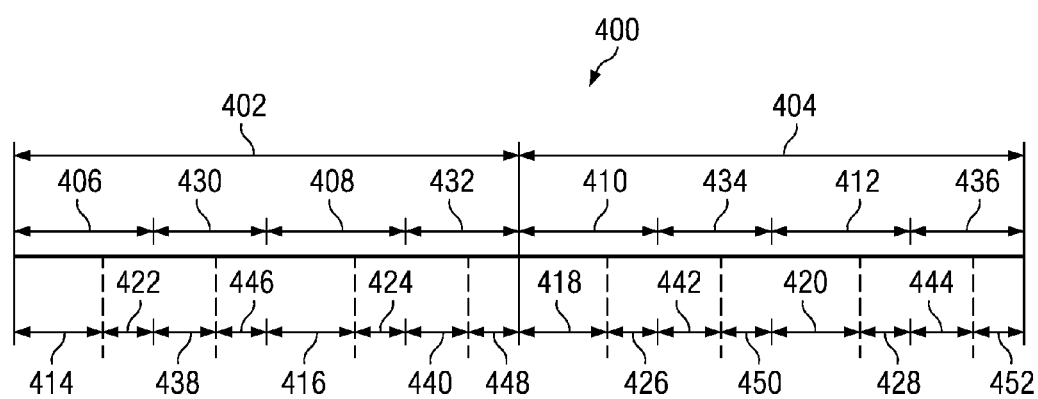
FIG. 4 is a timing diagram illustrating one embodiment of access scheduling according to the present invention.

Referring now to FIG. 4, diagram 400 depicts one embodiment of a timing diagram for operating system 100 in accordance with the present invention. Diagram 400 comprises a succession of service periods, such as 402 ($T_{SP(n)}$) and 404 ($T_{SP(n+1)}$). Period 402 includes two isochronous intervals, 406 ($T_{IE1}$) and 408 ($T_{IE2}$), just as period 404 includes isochronous intervals 410 ($T_{IE1}$) and 412 ($T_{IE2}$). After an isochronous stream has been admitted in accordance with the present invention, access coordinator 302 schedules access time for the admitted stream during one or more of these isochronous intervals. Each of the isochronous intervals 406, 408, 410 and 412 comprise primary access intervals 414 ($T_{PP1}$), 416 ($T_{PP2}$), 418 ($T_{PP1}$) and 420 ($T_{PP2}$), respectively. Each of the isochronous intervals 406, 408, 410 and 412 further comprise secondary or extension access intervals 422 ($T_{PE1}$), 424 ($T_{PE2}$), 426 ($T_{PE1}$) and 428 ($T_{PE2}$), respectively. In operation 400, each service period includes two primary access intervals of fixed time duration, to provide scheduled access times for isochronous streams. In addition, each service period may have one or both of the extension access intervals to provide additional access for isochronous streams. The operation depicted in diagram 400 is disclosed in further detail in co-assigned U.S. patent application Ser. No. 10/404,268, filed Apr. 1, 2003, which is herein incorporated by reference.

Referring further to FIG. 4, period 402 includes two asynchronous intervals, 430 ($T_{AE1}$) and 432 ($T_{AE2}$), just as period 404 includes asynchronous intervals 434 ($T_{AE1}$) and 436 ($T_{AE2}$). These intervals may be made available to provide access for asynchronous bursts. Time may, optionally, be made available during the asynchronous intervals for implementing a conventional mediation scheme (e.g., EDCF) in order to facilitate sending short data frames or reserving access times from stations having new asynchronous bursts to send. Accordingly, asynchronous intervals 430 and 432 further comprise periods 438 ($T_{AP1}$) and 440 ($T_{AP2}$), respectively, for providing contention-free access for asynchronous bursts. Similarly, asynchronous intervals 434 and 436 further comprise periods 442 ($T_{AP1}$) and 444 ($T_{AP2}$), respectively, for providing contention-free access for asynchronous bursts. Furthermore, asynchronous intervals 430 and 432 comprise periods 446 ($T_{C1}$) and 448 ($T_{C2}$), respectively, as access intervals for contention mediation. Asynchronous intervals 434 and 436 comprise periods 450 ($T_{C1}$) and 452 ($T_{C2}$), respectively, as access intervals for contention mediation.

In one embodiment of the present invention, where system 100 uses the timing sequences depicted in diagram 400 for access scheduling, processor 304 and MAC layer 202 compute the value ($T'_{IE}$), where:

$$T'_{IE} = T'_{IE1} + T'_{IE2} \quad (1)$$

for each successive service period. In operation:

$$T'_{IE1} = T'_{PP1} + T'_{PE1} \text{ and} \quad (2)$$

$$T'_{IE2} = T'_{PP2} + T'_{PE2}; \quad (3)$$

where ($T'_{PP1}$) and ($T'_{PP2}$) are the access times actually used in transmitting data during primary access intervals ($T_{PP1}$) and ($T_{PP2}$), respectively, of a service period. In like manner, ($T'_{PE1}$) and ($T'_{PE2}$) are the access times actually used in transmitting data during extended access intervals of the respective service periods.

Processor 304 continually evaluates and updates a rolling average of ($T'_{IE}$), following each service period. At the conclusion of each service period, the value of ($T'_{IE}$) is averaged over the last ($N_{IE}$) service periods, to generate a value ($T'_{IE, Avg}$). Thus, ($T'_{IE, Avg}$) is the cumulative average of actual access times used during each of the preceding ($N_{IE}$) service periods. In one embodiment of the invention, the threshold value ($N_{IE}$) is selected to be 10. In alternative embodiments, the threshold value of ($N_{IE}$) can be varied widely depending upon the desired performance characteristics of the communications system. Memory 306 may be used to store software for operating processor 304, and may also store computed values of ($T'_{IE, Avg}$), ($T'_{IE}$), and other quantities used for subsequent computations by processor 304.

If a station within WLAN 102 desires to gain access for a new isochronous stream, processor 304 computes a ratio:

$$R'_{IE} = T'_{IE,Avg}/T_{SP} \quad (4)$$

for the most recently updated average value ($T'_{IE, Avg}$). The value ($T_{SP}$) represents the time length of one of the ($N_{IE}$) service periods. In addition to determining a value for ($R'_{IE}$), the processor 304 also determines ratios ($R_{PP}$) and ($R_{PP+}$).

$$R_{PP} = T_{PP}/T_{SP}, \text{ where} \quad (5)$$

$$T_{PP} = T_{PP1} + T_{PP2}. \quad (6)$$

In other words, ($T_{PP}$) is the sum of the two primary access intervals of a service period. Since these intervals are the same for each service period, ($T_{PP}$) is a constant value. ($R_{PP+}$) is defined as:

$$(R_{PP+}) = T_{PP+}/T_{SP+}, \text{ where} \quad (7)$$

$$T_{PP+} = T_{PP1+} + T_{PP2+}. \quad (8)$$

($T_{PP1+}$) and ($T_{PP2+}$) are values, calculated by processor 304, that indicate the time length of the two primary access intervals of the next upcoming service period, in the event the new isochronous stream is admitted. ($T_{SP+}$) indicates the length of the corresponding service period.

After ($R'_{IE}$), ($R_{PP}$) and ($R_{PP+}$) have each been calculated, processor 304 compares ($R_{PP+}$) with a numerical threshold ($R_{U1}$). If ($R_{PP+}$)>($R_{U1}$), the new stream is rejected. However, if ($R_{PP+}$)≦($R_{U1}$), processor 304 generates the quantity ($R'_{IE+}$), where:

$$R'_{IE+} = R'_{IE} + R_{PP+} - R_{PP}. \quad (9)$$

($R'_{IE+}$) is then compared with a second numerical threshold ($R_{U2}$). The new stream is rejected if ($R'_{IE}$)>($R_{U2}$). Thus, the new stream is admitted for access scheduling in WLAN 102 only if ($R_{PP+}$)≦($R_{U1}$) and ($R'_{IE} + R_{PP+} - R_{PP}$)≦($R_{U2}$). In one embodiment of the present invention, ($R_{U1}$) is selected to be 0.75, and ($R_{U2}$) is selected to be 0.9. In alternative embodiments, the values of ($R_{U1}$) and ($R_{U2}$) can be varied greatly to effect a desired system performance level.

With the above disclosure, it should be apparent that various embodiments of a communication system according to the present invention may be used advantageously with the timing arrangement illustrated in diagram 400. It should also be apparent that the present invention comprehends that communication system embodiments may be readily used with other timing arrangements in accordance therewith. Furthermore, it should be apparent that although certain functional elements are illustrated as separate entities (e.g., processors 304 and 308), the present invention comprehends embodiments where such entities exist as separate devices, and as functional instances within a single device (e.g., a single digital signal processor). Alternative embodiments comprising various combinations of hardware, firmware and software functionalities are also comprehended by the present invention.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for controlling admission of a new isochronous data stream, within a WLAN system that transports both isochronous and asynchronous data, the method comprising:
    evaluating actual access times of previously admitted isochronous data streams, comprising:
        providing a first threshold number;
        determining a first value equal to the length of an individual previous service period:
        calculating a second value equal to an average of actual total access times used for isochronous streams during each of the first threshold number of previous service periods;
    determining projected access times needed by the new isochronous data stream, comprising:
        calculating a third value equal to, if and when the new isochronous data stream is admitted, the length of a new service period; and
        calculating a fourth value equal to, if and when the new isochronous data stream is admitted, a total primary access portion of the new service period; and deciding to admit or reject the new isochronous data stream based on an evaluation of the actual and projected access times.

2. The method of claim 1, wherein the WLAN system schedules successive isochronous data streams for transport during successive service periods.

3. The method of claim 1, wherein the service period comprising a primary access portion and an extended access portion.

4. The method of claim 1, wherein deciding to admit or reject the new isochronous data stream based on an evaluation of the actual and projected access times further comprising:
   calculating a fifth value equal to the second value divided by the first value;
   determining a sixth value equal to a total primary access portion of an individual previous service period;
   calculating a seventh value equal to the sixth value divided by the first value; and
   calculating an eighth value equal to the fourth value divided by the third value.

5. The method of claim 4, wherein deciding to admit or reject the new isochronous data stream based on an evaluation of the actual and projected access times further comprising:
   providing a second threshold value; and
   comparing the eighth value with the second threshold value.

6. The method of claim 5, wherein deciding to admit or reject the new isochronous data stream based on an evaluation of the actual and projected access times further comprises rejecting the new isochronous data stream upon determining that the eighth value is greater than the second threshold value.

7. The method of claim 5, wherein, upon determining that the eighth value is less than or equal to the second threshold value, deciding to admit or reject the new isochronous data stream based on an evaluation of the actual and projected access times further comprising:
   providing a third threshold value;
   calculating a ninth value equal to the sum of the fifth and eighth values, less the seventh value; and
   comparing the ninth value with the third threshold value.

8. The method of claim 5, wherein the second threshold value is 0.75.

9. The method of claim 7, further comprising rejecting the new isochronous data stream upon determining that the ninth value is greater than the third threshold value.

10. The method of claim 7, further comprising admitting the new isochronous data stream for scheduling access upon determining that the ninth value is less than or equal to the third threshold value.

11. The method of claim 7, wherein the third threshold value is 0.9.

12. A system for controlling isochronous data admission, within a WLAN system that transports both isochronous and asynchronous data, the system comprising:
   a processor; and
   a computer readable medium communicatively coupled to the processor, comprising processor instructions adapted to cause the processor to:
      evaluate actual access times of previously admitted isochronous data streams, comprising:
         provide a first threshold number;
         determine a first value equal to the length of an individual previous service period;
         calculate a second value equal to an average of actual total access times used for isochronous streams during each of the first threshold number of previous service periods;
      determine projected access times needed by a new isochronous data stream, comprising:
         calculate a third value equal to, if and when the new isochronous data stream is admitted, the length of a new service period;
         calculate a fourth value equal to, if and when the new isochronous data stream is admitted, a total primary access portion of the new service; and
      decide to admit or reject the new isochronous data stream based on an evaluation of the actual and projected access times.

13. The system of claim 12, wherein the WLAN system schedules successive isochronous data streams for transport during successive service periods.

14. The system of claim 12, wherein the service period comprising a primary access portion and an extended access portion.

15. The system of claim 12, wherein the processor instructions adapted to cause the processor to decide to admit or reject the new isochronous data stream based on an evaluation of the actual and projected access times further comprise instructions adapted to cause the processor to:
   calculate a fifth value equal to the second value divided by the first value;
   determine a sixth value equal to a total primary access portion of an individual previous service period;
   calculate a seventh value equal to the sixth value divided by the first value; and
   calculate an eighth value equal to the fourth value divided by the third value.

16. The system of claim 15, wherein the processor instructions adapted to cause the processor to decide to admit or reject the new isochronous data stream based on an evaluation of the actual and projected access times further comprise instructions adapted to cause the processor to:
   provide a second threshold value; and
   compare the eighth value with the second threshold value.

17. The system of claim 16, wherein the processor instructions adapted to cause the processor to decide to admit or reject the new isochronous data stream based on an evaluation of the actual and projected access times further comprise instructions adapted to cause the processor to reject the new isochronous data stream upon determining that the eighth value is greater than the second threshold value.

18. The system of claim 16, wherein, upon determining that the eighth value is less than or equal to the second threshold value, the processor instructions adapted to cause the processor to decide to admit or reject the new isochronous data stream based on an evaluation of the actual and projected access times further comprise instructions adapted to cause the processor to:
   provide a third threshold value;
   calculate a ninth value equal to the sum of the fifth and eighth values, less the seventh value; and
   compare the ninth value with the third threshold value.

19. The system of claim 16, wherein the second threshold value is 0.75.

20. The system of claim 16, wherein one or more steps are managed by an upper MAC layer associated with the processor.

21. The system of claim 18, further comprising instructions adapted to cause the processor to reject the new isochronous data stream upon determining that the ninth value is greater than the third threshold value.

22. The system of claim 18, further comprising instructions adapted to cause the processor to admit the new isochronous data stream for scheduling access upon determining that the ninth value is less than or equal to the third threshold value.

23. The system of claim 18, wherein the third threshold value is 0.9.

24. The system of claim 18, wherein one or more steps are managed by an upper MAC layer associated with the processor.

25. The system of claim 20, wherein the processor is adapted to operate on time quantities with latencies on the order of milliseconds.

26. The system of claim 24, wherein the processor is adapted to operate on time quantities with latencies on the order of milliseconds.

27. An apparatus, functioning as an access point within a WLAN system that transports both isochronous and asynchronous data, the apparatus comprising:
   a first memory;
   a transceiver communicatively coupled to the first memory; and
   an access coordinator communicatively coupled to the first memory and adapted to evaluate actual access times of previous isochronous data streams by
   providing a first threshold number;
   determining a first value equal to the length of an individual previous service period:
   calculating a second value equal to an average of actual total access times used for isochronous streams during each of the first threshold number of previous service periods, and
   to determine projected access times needed by a new isochronous data stream, and to decide to admit or reject the new isochronous data stream based on an evaluation of the actual and projected access times by
   calculating a third value equal to, if and when the new isochronous data stream is admitted, the length of a new service period;
   calculate a fourth value equal to, if and when the new isochronous data stream is admitted, a total primary access portion of the new service period; and
   decide to admit or reject the new isochronous data stream based on an evaluation of the actual and projected access times.

28. The apparatus of claim 27, wherein the access coordinator further comprises a first processor coupled to the first memory and adapted to evaluate actual access times of previous isochronous data streams, to determine projected access times needed by a new isochronous data stream, and to decide to admit or reject the new isochronous data stream based on an evaluation of the actual and projected access times.

29. The apparatus of claim 28, wherein the access coordinator further comprises a second processor, coupled to the first memory and to a second memory, and adapted to schedule access time for a new isochronous data stream once the first processor decides to admit the new isochronous data stream.

30. The apparatus of claim 28, wherein the first processor is adapted to operate on time quantities with latencies on the order of milliseconds.

31. The apparatus of claim 29, wherein the second processor is adapted to operate on time quantities with latencies on the order of milliseconds.

* * * * *